United States Patent [19]
Yamakawa et al.

[11] Patent Number: 5,239,620
[45] Date of Patent: Aug. 24, 1993

[54] RULE GENERATING AND VERIFYING APPARATUS FOR FUZZY CONTROL

[75] Inventors: Takeshi Yamakawa, Iizuka; Tsutomu Ishida, Suita, both of Japan

[73] Assignee: Omron Tateisi Electronics Co., Kyoto, Japan

[21] Appl. No.: 924,589

[22] Filed: Aug. 6, 1992

Related U.S. Application Data

[60] Continuation of Ser. No. 714,828, Jun. 13, 1991, abandoned, which is a division of Ser. No. 392,303, Aug. 11, 1989, abandoned.

[30] Foreign Application Priority Data

Aug. 18, 1988 [JP] Japan .................................. 63-203912

[51] Int. Cl.$^5$ ............................................. G06F 15/18
[52] U.S. Cl. ..................................... 395/76; 395/900; 395/51; 395/61
[58] Field of Search ...................... 395/51, 61, 76, 900

[56] References Cited

PUBLICATIONS

Teiresias; pp. 87-101; Volume II; The Handbook of Artificial Intelligence; Barr et al; 1982.
A Fuzzy Knowledge-Based System Shell-System Z-1; Leung et al; Tencon 87; pp. 655 (20.3.1) to 659 (20.3.5); 1987.
A Framework for Knowledge Based Systems in Nail; Chau et al; Phoenix Conf. on Computers & Communications; pp. 286-291; 1987.
Chapter 12—Production Systems; Artificial Intelligence Programming; Charniak et al; pp. 248-275, 472; Lawrence Erlbaum Associates; 1987.
An Intelligent Feature Extractor for Automated Machining; Kumar et al.; 5th Inter. Conf. on Systems Engineering; Sep. 9-11, 1987; pp. 237-240.
A Fuzzy Logic Programming Environment for Real-Time Control; Chiu et al.; International Journal of Approximate Reasoning 1988; 2:163-175; 1988 Elsevier Sci. Pub. Co. Inc.

*Primary Examiner*—Allen R. MacDonald
*Attorney, Agent, or Firm*—Dickstein, Shapiro & Morin

[57] ABSTRACT

Applicable rules (IF-THEN rules) are generated with use of predetermined membership functions concerning input and values. Whether the rules are appropriate is verified by making fuzzy inferences according to the generated rules with at least one of the rules temporarily excluded.

6 Claims, 5 Drawing Sheets

RULE GENERATING AND VERIFYING APPARATUS FOR FUZZY CONTROL

This application is a continuation of application Ser. No. 07/714,828 filed Jun. 13, 1991, now abandoned, which is a divisional of application Ser. No. 07/392,303 filed Aug. 11, 1989 now abandoned.

BACKGROUND OF THE INVENTION

1. Field of the Invention

The present invention relates to rule generating apparatuses and rule verifying apparatuses for fuzzy control.

2. Description of the Background Art

A fuzzy control device for performing control by fuzzy inferences or fuzzy arithmetic operations has been in the spotlight. The fuzzy control device is also referred to as a fuzzy inference arithmetic unit, a fuzzy controller or a fuzzy computer, which is realized by not only a dedicated device for fuzzy inferences (either an analogue or digital type device) (see, for example, "NIKKEI ELECTRONICS", NIKKEI McGRAW HILL BOOK COMPANY, Jul. 27, 1987, No. 426, pp. 148-152) but also a binary type computer, processor or the like programmed so as to implement fuzzy inferences.

In any case, membership functions concerning input and output variables and rules must be set in order to operate the fuzzy control device. The rules and the membership functions are mutually related, so that their designs made to obtain desired control performance are substantially complicated.

SUMMARY OF THE INVENTION

An object of the present invention is to provide an apparatus capable of automatically generating rules for fuzzy control, or at least candidates for applicable rules.

The present invention also provides an apparatus capable of verifying whether or not a rule made or set is appropriate.

The rule means herein a rule of an IF-THEN type or a rule for a modus ponens inference.

A rule generating apparatus for fuzzy control according to the present invention comprises; means for storing a plurality of predetermined membership functions for fuzzy control concerning an input variable and a plurality of predetermined membership functions for fuzzy control concerning an output variable; means for inputting paired data comprising a predetermined input value and an output value to be obtained by a fuzzy inference when the predetermined input value is given; first processing means for finding degrees of adaptation of the given input value to the plurality of membership functions (grades of membership functions) concerning the input variable to extract a membership function concerning which the found degree of adaptation exceeds a required first reference degree of adaptation; second processing means for finding degrees of adaptation of the given output value to the plurality of membership functions concerning the output variable to extract a membership function concerning which the found degree of adaptation exceeds a required second reference degree of adaptation; and means for outputting the extracted membership functions concerning the input and output variables. This rule generating apparatus is applicable to not only a case in which there is one kind of input variable but also a case in which there are two or more kinds of input variables.

In this rule generating apparatus, the membership functions concerning the input and output variables are basically fixed. However, it is, of course, possible to repeat the generation of rules while changing the shapes of the membership functions.

The rule generating apparatus according to the present invention is particularly useful in a case in which an input value to a fuzzy control device and an output value corresponding thereto have been previously found. Data concerning the input value and the output value can be obtained from past data of the system to be controlled such as running data and operating data. In the rule generating apparatus according to the present invention, applicable rules or candidates to be employed as rules can be obtained only by entering a pair of the input value and the output value corresponding thereto. The generated rules may be used without any modification. Alternatively, only rules of particular use extracted from the generated rules by suitable selection based on simulation or the like can be used. According to the present invention, time or labor required to make rules can be significantly reduced in the above described manner.

A rule verifying method and apparatus for fuzzy control according to the present invention comprises; the step of and means for storing set rules and membership functions concerning input and output variables and related to the rules; the step of and means for specifying a rule to be temporarily excluded from a fuzzy inference operation; and the step of and inference means for subjecting a given or arbitrary input value to a fuzzy inference operation using stored rules excluding the stored rule specified as one to be excepted to obtain a corresponding output value; and the step of and means for outputting the output value obtained by the fuzzy inference operation.

According to the present invention, when a rule to be excepted is specified, a fuzzy inference is made in accordance with the stored rules excluding the specified rule, to obtain the fuzzy inference result. Accordingly, the present invention is particularly effective in examining which rule is important out of a lot of applicable rules. Consequently, the number of rules to be finally set can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3 to 5 illustrates the display screen in rule generating processing, and FIGS. 6 and 7 illustrates the display screen in rule verifying processing; in FIG. 6 the results of a fuzzy inference using all or a portion of a set of fuzzy rules on input data is displayed; in FIG. 7 results of fuzzy inference using all or a portion of a set of fuzzy rules on input data interpolated input data is displayed and FIG. 8 is a diagram showing an example of a display screen in a case in which there are two types of input variables.

DESCRIPTION OF THE PREFERRED EMBODIMENTS

A rule generating apparatus for fuzzy control according to the present invention is feasible by a binary type computer, for example, a microprocessor. In the present embodiment, the rule generating apparatus for fuzzy control is realized by an ordinary computer system including a CPU.

Figure 1:
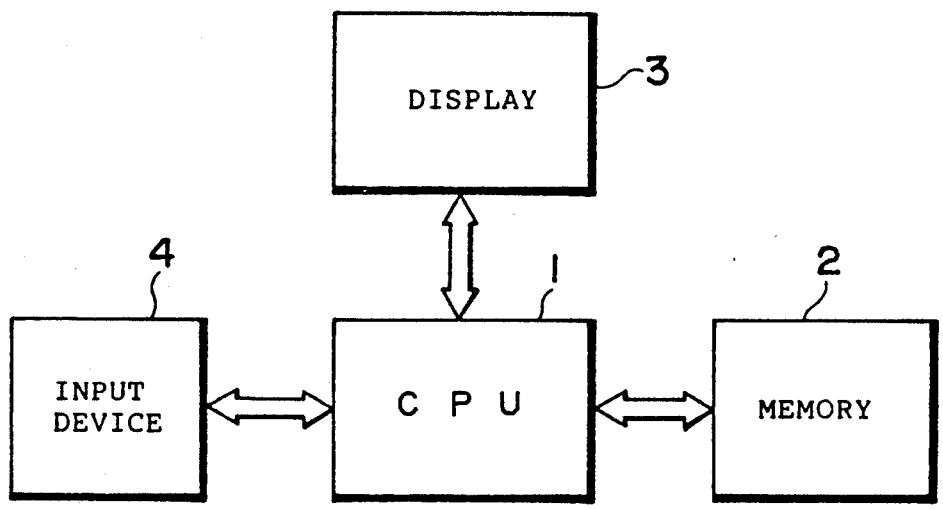
FIG. 1 is a block diagram showing a structure of a rule generating and verifying apparatus for fuzzy control.

FIG. 1 is a diagram showing a schematic structure of a rule generating and verifying apparatus for fuzzy control, which comprises a CPU 1 for performing rule generating and verifying processing and a memory 2 connected thereto. The memory 2 stores membership functions concerning input and output variables and other data. The CPU 1 is further connected to a display device 3 and an input device 4. The display device 3 is, for example, a CRT (cathode ray tube) display device. Input and output values, the membership functions, generated rules and the like are displayed on the display device 3. The input device 4 comprises a mouse for specifying the positions of points indicating the input and output values on a display screen, keys attached to the mouse, and various function keys, a ten-key pad and the like provided on a keyboard. A printer, for example, in addition to the display device 3, may be connected as an output device.

In the present embodiment, we will consider membership functions expressed by linguistic information PL, PM, PS, ZR, NS, NM and NL. PL, PM, PS, ZR, NS, NM and NL respectively represent a positive large value, a positive medium value, a positive small value, almost zero, a negative small value, a negative medium value and a negative large value.

Let x and y be respectively input variables and z an output variable. When there is one kind of input variable (only x), an example of rules for fuzzy control is expressed as follows:

If $x=NS$ then $z=NM$

This indicates a rule "If x is NS, then z is NM".

When there are two kinds of input variables (x and y), an example of rules for fuzzy control is expressed as follows:

If $x=NS$ and $y=NM$ then $z=NL$

This indicates a rule "If x is NS and y is NM, then z is NL".

In the rule generating apparatus according to the present invention, the above described rules are automatically generated by providing the inputs x (and y) and the output z corresponding thereto (an output value to be obtained by a fuzzy inference when the inputs x (y) are applied).

Figure 2:
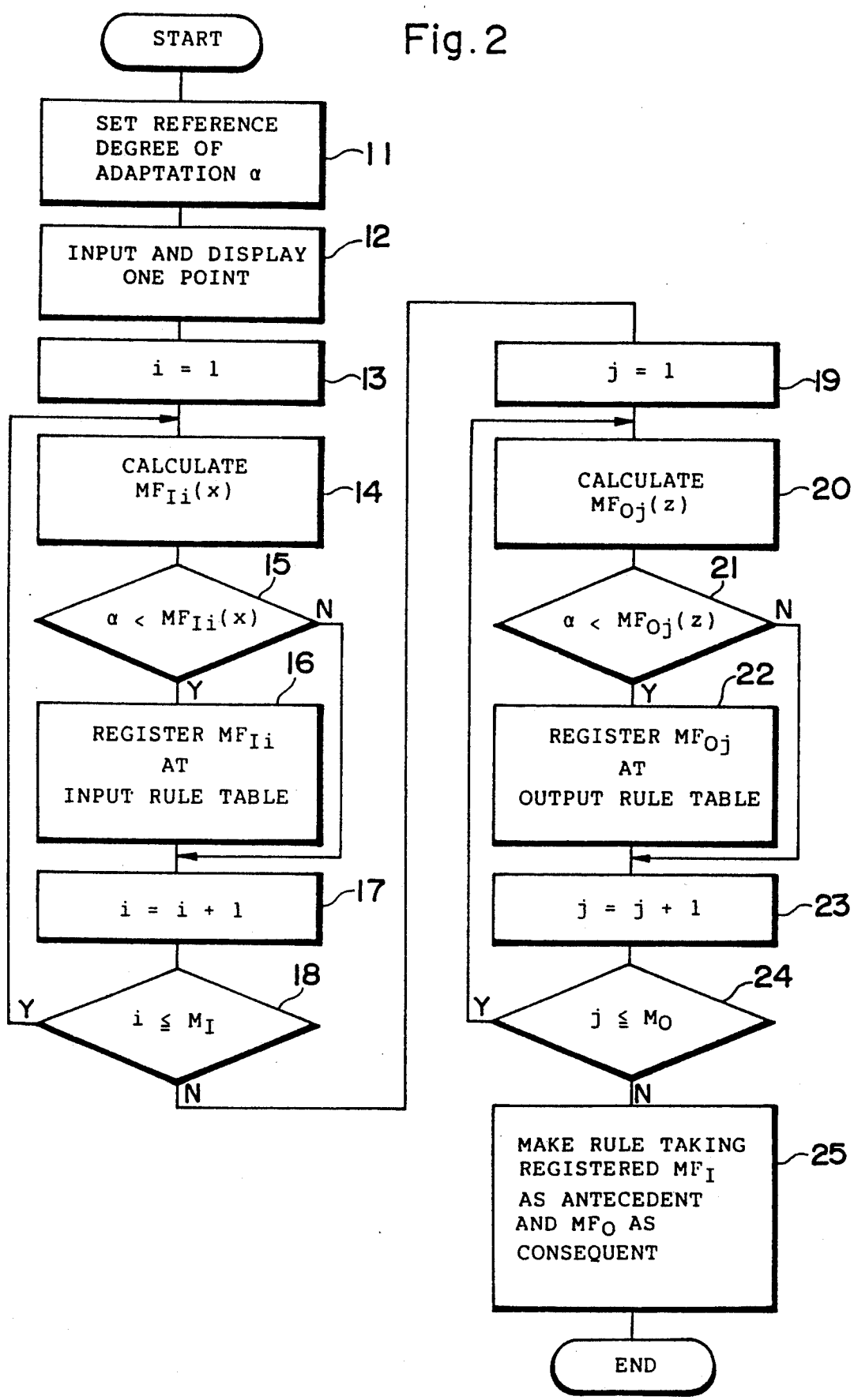
FIG. 2 is a flow chart showing the procedure of rule generating processing.
Figure 4:
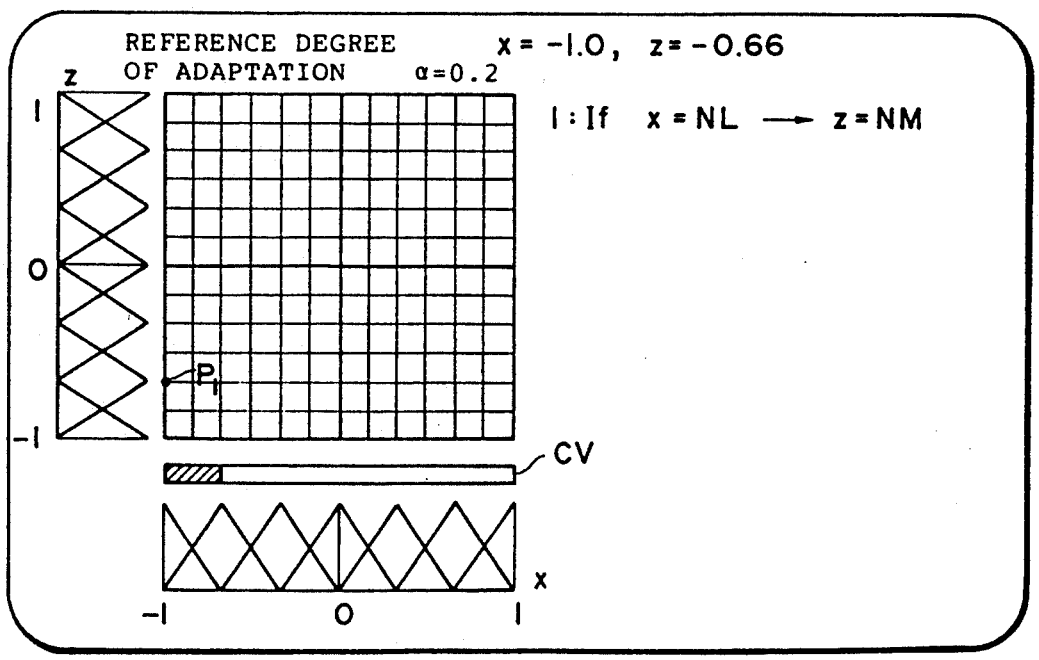
Figure 5:
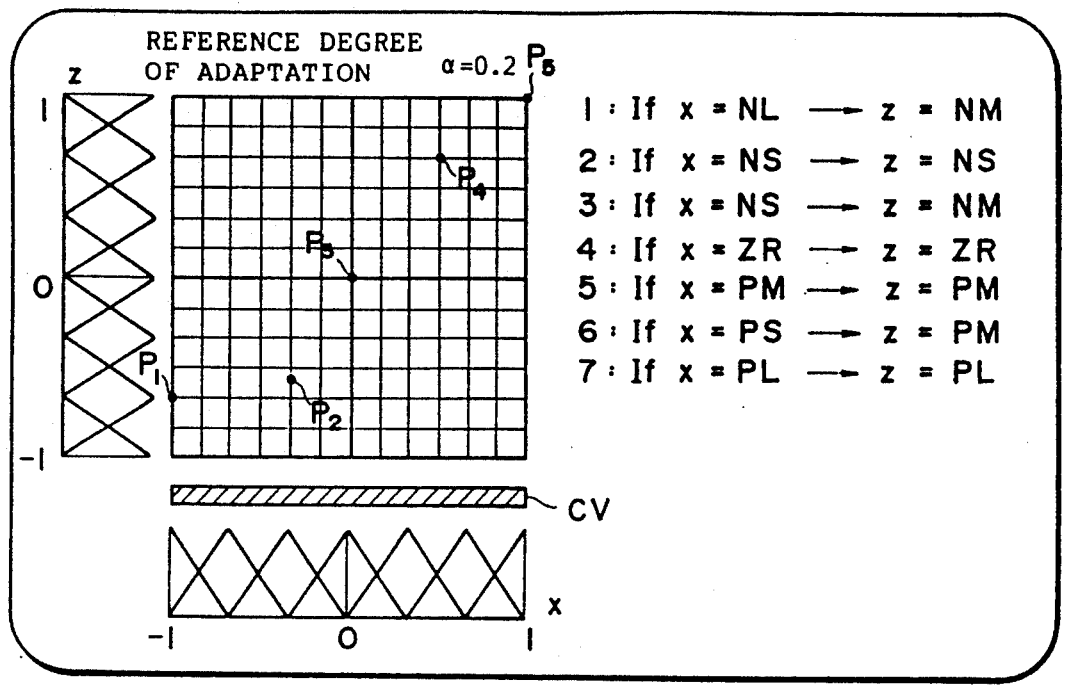

For simplicity, the procedure of rule generating processing performed when there is one kind of input variable (only x) will be described with reference to a flow chart of FIG. 2 and display screens shown in FIGS. 3 to 5.

Figure 3:
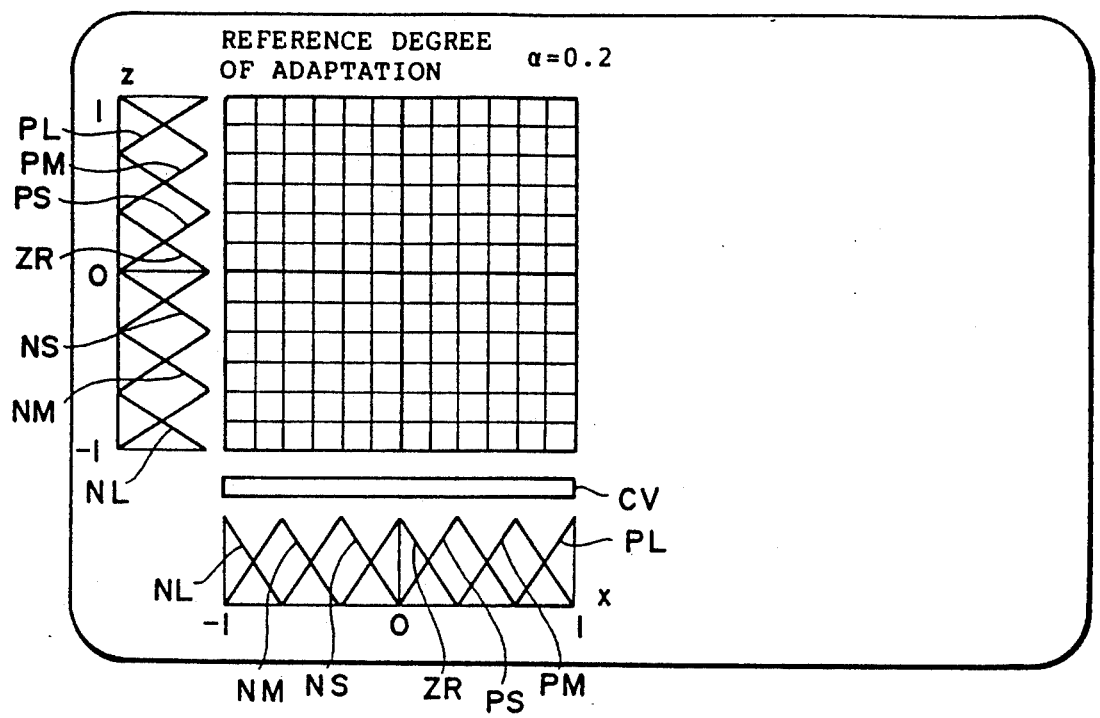
FIGS. 3 to 7 are diagrams showing an example of a display screen, where

As shown in FIG. 3, a coordinate system comprising the axis of abscissa for the input variable x and the axis of ordinate for the output variable z and membership functions respectively concerning the input variable x and the output variable z with respect to the axis of abscissa and the axis of ordinate are displayed on the display screen of the display device 3. In the present embodiment, membership functions in a triangular shape are illustrated for simplicity. In addition, the membership function concerning the input variable x and the membership function concerning the output variable z are precisely the same. Such membership functions have been previously set in the memory 2. When all the membership functions take the same shape (the positions thereof are different), however, it is sufficient to previously store a membership function, for example, of ZR and shift the same on the x-axis and z-axis as required. A display band area CV for indicating a range of the input variable x covered with made rules is further displayed on the display screen.

First, a reference degree of adaptation $\alpha$ is entered from the keyboard of the input device 4 (step 11). This reference degree of adaptation $\alpha$ is used in determining whether or not a membership function is used as a candidate for a rule. When a function value of a membership function with respect to an input value is larger than this reference degree of adaptation $\alpha$, the membership function is employed as a candidate for a rule. The reference degree of adaptation must be set respectively with respect to an input and an output. In this embodiment, a single degree of adaptation $\alpha=0.2$ is common to both the input and the output. The entered value $\alpha=0.2$ is displayed on the display device 3 (see FIG. 3).

Subsequently, a pair of a first input value $x_1$ and output value $z_1$ (point $P_1$ ($x_1=-1$, $z_1=-0.66$)) in the coordinate system on the display screen is inputted using the mouse of the input device 4 (step 12, see FIG. 4). When input of this point $P_1$ is completed (the point $P_1$ is fixed on the display screen), degrees of adaptation of the input value $x_1$ to all the membership functions concerning the input variable are respectively calculated, to extract a membership function or membership functions to be employed as a candidate for a rule or candidates for rules on the basis of the result of this calculation (steps 13 to 18).

$MF_{Ii}$ is taken as a membership function concerning an input variable (i=1 to $M_I$; $M_I$ is the number of membership functions concerning the input variable; $M_I=7$ in the present embodiment), and $MF_{Ii}(x)$ is taken as a function value of the membership function with respect to the input value x, that is, a grade of membership function or a degree of adaptation.

i is set to 1 (step 13), $MF_{Ii}(x)$ is calculated (step 14), it is determined whether or not $MF_{Ii}(x)$ exceeds the reference degree of adaptation $\alpha$ (step 15), and $MF_{Ii}$ is registered at an input rule table in the memory 2 if it exceeds the reference degree of adaptation $\alpha$ (step 16). After this processing is performed or if the answer is in the negative in the step 15, i is incremented (step 17). Processing in the steps 14 to 17 is repeated until i reaches $M_I+1$.

Subsequently, degrees of adaptation of the output value $z_1$ to all the membership functions concerning the output variable are respectively calculated in the same manner, to extract a membership function to be employed as a candidate for a rule (steps 19 to 24).

$MF_{Oj}$ is taken as a membership function concerning an output variable (j=1 to $M_O$; $M_O$ is the number of membership functions concerning the output variable; $M_O=7$ in the present embodiment), and $MF_{Oj}(z)$ is taken as a function value of the membership function with respect to the output value z, that is, a grade of membership function or a degree of adaptation.

Finally, a rule is made which respectively takes the membership function $MF_{Ii}$ concerning an input variable registered at the rule table in the step 16 and the membership function $MF_{Oj}$ concerning an output variable registered at an output rule table in the step 22 as an antecedent and a consequent. This rule is displayed on the display device 3 (step 25, see FIG. 4).

The registered membership functions $MF_I$ and $MF_O$ are respectively only NL and NM with respect to the point $P_1$. Accordingly, only one rule (rule 1) is made. "then" is represented by an arrow on the display screen. Furthermore, in the display band area CV on the display screen, a range of the input variable x covered with this rule 1 (i.e., membership function NL) is represented by hatching.

In the step 25, when a plurality of membership functions concerning input and output variables are registered, rules are made by a combination of these membership functions. For example, when the respective numbers of the registered membership functions $MF_I$ and $MF_O$ are two, a total of four rules are made.

Every time a pair of an input value and an output value (point $P_2$, $P_3$, $P_4$, $P_5$ or the like) is inputted, the above described processing is performed. FIG. 5 illustrates an example of the display screen in a case in which the five points ($P_1$ to $P_5$) are inputted and making of rules related to the points is terminated. The rule 1 is made on the basis of the point $P_1$, as described above. Similarly, rules 2 and 3 are made on the basis of the point $P_2$, a rule 4 is made on the basis of the point $P_3$, rules 5 and 6 are made on the basis of the point $P_4$, and a rule 7 is made on the basis of the point $P_5$. The entire display band area CV is represented by hatching. Accordingly, it is found that all areas of the input variable x are completely covered with a range of definition of the membership functions which are related to the rules 1 to 7.

The rule generating and verifying apparatus according to the present invention can also verify whether or not correct fuzzy control can be achieved on the basis of the plurality of rules made in the above described manner.

The verifying operation includes verification and interpolation with respect to input points.

Figure 6:
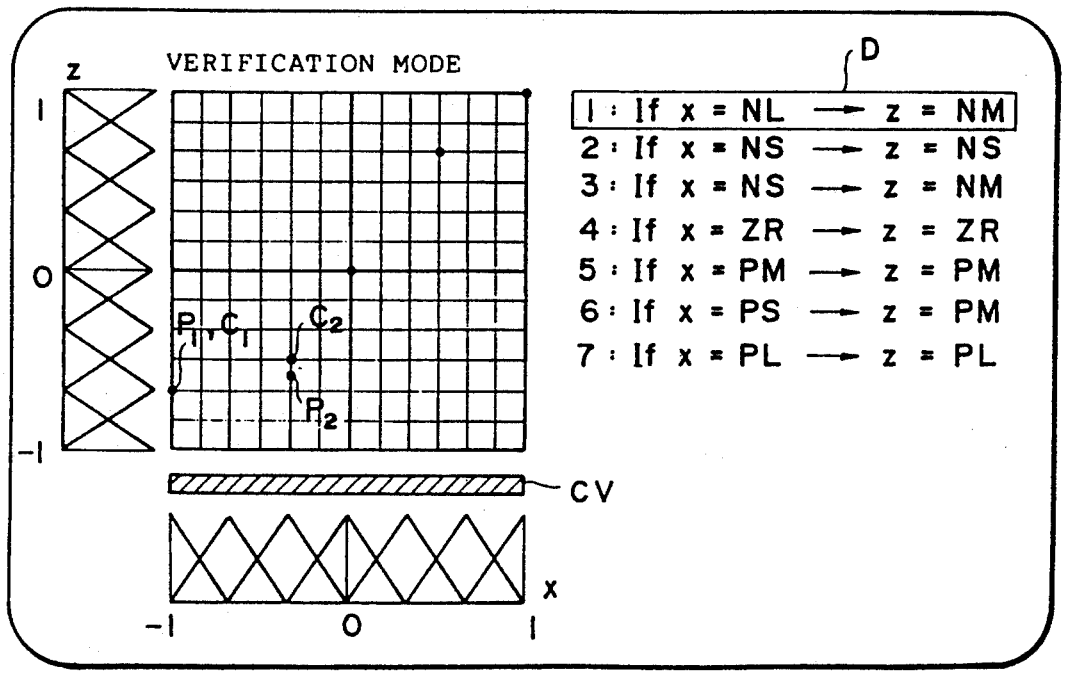

The verification with respect to the input points is achieved in the following manner. First, the input value $x_1$ representing the input point $P_1$ is subjected to a fuzzy inference using all the made rules 1 to 7 to obtain the result $z_{c1}$ of the inference with respect to the corresponding output value $z_1$, thereby to display a point $C_1$ ($x_1$, $z_{c1}$). In an example of the display screen shown in FIG. 6, the input point $P_1$ and the point $C_1$ obtained by the inference are overlapped with each other, which indicates that the rules are appropriate. A known operation rule for fuzzy inference, for example, a MIN-MAX operation rule can be used for fuzzy inferences. Subsequently, in the same manner, an input value $x_2$ representing the input point $P_2$ is subjected to a fuzzy inference using all the rules, thereby to display a point $C_2$ ($x_2$, $z_{c2}$) obtained by the inference. In FIG. 6, the point $C_2$ is slightly shifted from the input point $P_2$. It is necessary for an operator to determine whether or not this shift is allowed. Similarly, each of input values representing the input points is subjected to a fuzzy inference using all the rules, thereby to display a point indicating the result of the inference on the display screen.

Figure 7:
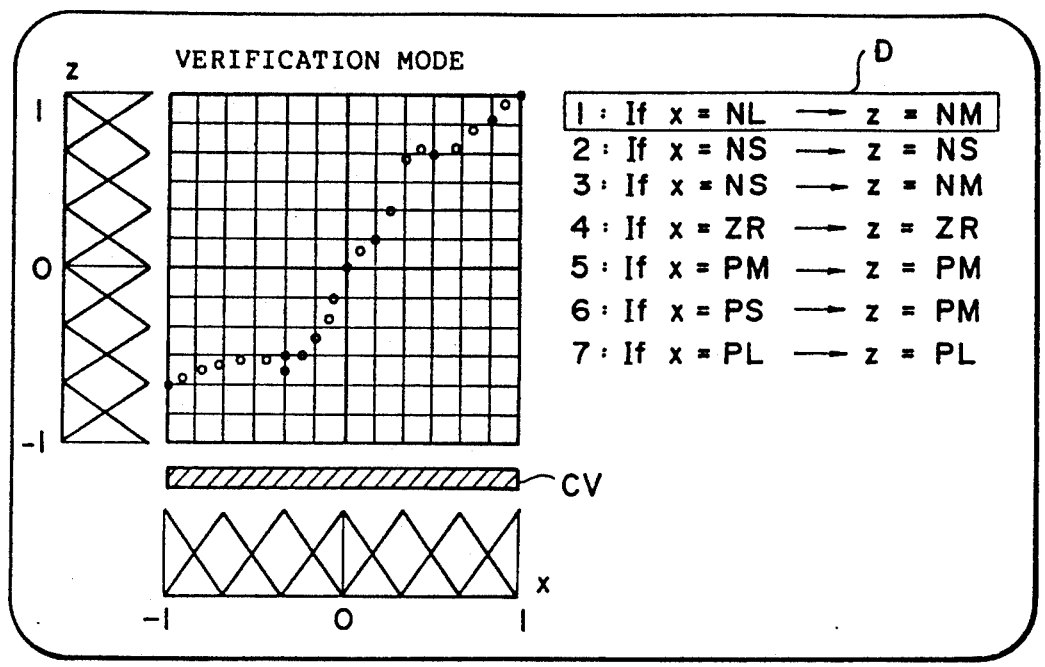

Verification by interpolation is achieved in the following manner. One or a plurality of interpolation points are selected between two points such as between input values $x_1$ and $x_2$ and between $x_2$ and $x_3$. The interpolation points may be set at constant intervals. The operator may enter the interpolation points using the input device 4 or the CPU 1 may automatically set the same. Each of the interpolation points is subjected to a fuzzy inference operation using all the rules so as to obtain an output value corresponding thereto. Points defined by the interpolation points (input values) (the x-coordinate) and the output values obtained by the inference (the z-coordinate) are represented by hollow circles on the coordinate system of the display screen as shown in FIG. 7. The operator can verify by watching this display whether or not inferences can be suitably implemented in places other than the input points using the made rules.

The significance of the made rules can be checked. This check is performed by excepting a rule to be checked from the inference operation. When a rule to be excepted is specified by the input device 4, the specified rule is enclosed with a frame D on the display screen as clearly shown in FIGS. 6 and 7. The above described verification or interpolation with respect to the input points can be achieved using all rules other than the rule thus specified to be excepted, so that the results of inferences are displayed in the same manner. The operator can determine by watching this display whether the excepted rule is indispensable or is not necessarily required. Not only one but also a plurality of rules can be simultaneously specified as rules to be excepted.

The rule generating and verifying apparatus may be returned to the above described rule generation mode after such rule verifying processing. In the rule generation mode, a new rule can be generated or a rule made by the operator can be entered. Thereafter, the operation in the verification mode may be performed again. In some instances, rules may be generated or verified again in the same manner by changing the shapes of or modifying the membership functions.

Figure 8:
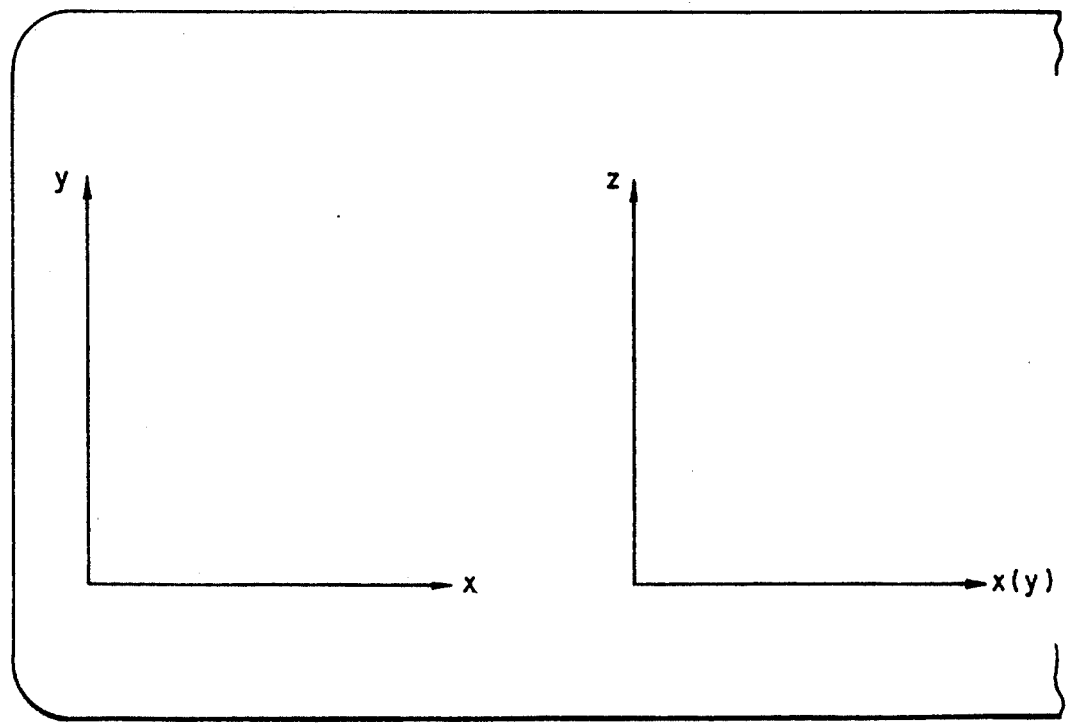

Although in the above described embodiment, description was made of a case in which there is one kind of input variable, it should be noted that the present invention can be applied to a case in which there are two or more kinds of input variables. When there are two kinds of input variables x and y, two coordinate systems may be displayed on a display screen as shown in FIG. 8, the input variables x and y being specified by one of the coordinate systems, while an output variable z corresponding to the input variable x (or y) being specified by the other coordinate system. Input and output points can be also specified in three dimensions using the x, y and z coordinate system. The processing in the steps 13 to 18 shown in FIG. 2 is performed with respect to the other input variable y. In the step 25, a rule may be made by a combination of registered membership functions concerning each of the input variables x and y and registered membership functions concerning the output variable z.

As can be seen from FIG. 7, the apparatus according to the present invention can generate a non-linear function using made rules. Accordingly, the apparatus can be utilized as a function generator.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rule verifying apparatus for fuzzy control, comprising:
   a memory device storing set fuzzy rules and fuzzy membership functions concerning input and output variables and related to the set rules;
   an input device for specifying at least one stored fuzzy rule to be temporarily excluded from said set rules when the set rules are used in a fuzzy inference operation; said at least one temporarily excluded rule remaining stored along with the other set rules;
   a fuzzy inference device connected to said memory device and said input device and which subjects an input value to a fuzzy inference operation using said stored set rules excluding said at least one stored rule specified as being temporarily excluded, to obtain a corresponding output value; and
   an output device connected to said fuzzy inference device which outputs the output value obtained by the fuzzy inference operation performed by said fuzzy inference device.

2. The rule verifying apparatus for fuzzy control according to claim 1, wherein said specifying device specifies a plurality of stored rules to be temporarily excluded.

3. The rule verifying apparatus as in claim 1, wherein said outputting means is a display device for displaying said output value.

4. A rule verifying method for fuzzy control comprising the steps of:
   storing in a storage device set fuzzy rules and fuzzy membership functions concerning input and output variables and related to said set rules;
   specifying with an input device at least one stored rule to be temporarily excluded from said set rules when the set rules are used in a fuzzy inference operation, said at least one temporarily excluded rule remaining stored along with the other set rules;
   subjecting an input value to a fuzzy inference operation with a fuzzy inference processor using said stored set rules excluding said at least one rule specified as being temporarily excluded, to obtain a corresponding output value; and
   outputting said output value obtained by said fuzzy inference operation to an output device.

5. The method for verifying rules for fuzzy control according to claim 4, wherein said specifying step specifies a plurality of stored rules to be temporarily excluded from said set rules.

6. The method for verifying rules for fuzzy control according to claim 4, wherein said outputting step displays said output value on a display device.

* * * * *